(12) United States Patent
Titze et al.

(10) Patent No.: US 10,438,723 B2
(45) Date of Patent: Oct. 8, 2019

(54) PLUGGABLE HIGH-VOLTAGE BUSHING AND HIGH-VOLTAGE INSTALLATION HAVING THE PLUGGABLE HIGH-VOLTAGE BUSHING

(71) Applicant: SIEMENS AKTIENGESELLSCHAFT, Munich (DE)

(72) Inventors: Joachim Titze, Ratingen (DE); Engelbert Engels, Cologne (DE); Achim Langens, Lohmar (DE); Tim Schnitzler, Kreuzau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/047,272

(22) Filed: Jul. 27, 2018

(65) Prior Publication Data

US 2019/0035516 A1    Jan. 31, 2019

(30) Foreign Application Priority Data

Jul. 27, 2017  (EP) .................................. 17183517

(51) Int. Cl.
| | |
|---|---|
| *H01B 7/42* | (2006.01) |
| *H01B 17/28* | (2006.01) |
| *H02G 15/02* | (2006.01) |
| *H02G 3/22* | (2006.01) |
| *H01B 17/30* | (2006.01) |

(Continued)

(52) U.S. Cl.
CPC ............ *H01B 7/423* (2013.01); *H01B 17/28* (2013.01); *H01B 17/303* (2013.01); *H02G 3/22* (2013.01); *H02G 15/025* (2013.01); *H01F 27/02* (2013.01); *H01F 27/321* (2013.01)

(58) Field of Classification Search
CPC combination set(s) only.
See application file for complete search history.

(56) References Cited

U.S. PATENT DOCUMENTS 2,600,979 A * 6/1952 Dormont ................. H01F 27/04
174/12 R
4,123,618 A * 10/1978 Cushing ................. H01B 17/26
165/104.21

(Continued)

FOREIGN PATENT DOCUMENTS

DE         7728374 U1     3/1979
DE     102007022641 A1 * 11/2008 ............. H01F 27/02

(Continued)

*Primary Examiner* — William H. Mayo, III
*Assistant Examiner* — Krystal Robinson
(74) *Attorney, Agent, or Firm* — Laurence Greenberg; Werner Stemer; Ralph Locher

(57) ABSTRACT

A high-voltage bushing can be plugged into a bushing socket of an electrical device of a high-voltage installation. The high-voltage bushing has an internal conductor, an insulating body which at least partly encloses the internal conductor, and a plug-in section for plugging the high-voltage bushing into the bushing socket. A heat pipe is provided in the internal conductor. The heat pipe is at least partly filled with a vaporizable cooling liquid and the heat pipe extends into the plug-in section. A high-voltage installation having the high-voltage bushing is also provided.

10 Claims, 1 Drawing Sheet

(51) Int. Cl.
*H01F 27/32* (2006.01)
*H01F 27/02* (2006.01)

(56) References Cited

U.S. PATENT DOCUMENTS

| | | | | |
|---|---|---|---|---|
| 4,321,421 | A | * | 3/1982 | Pierce ..................... H01F 27/18 |
| | | | | 174/11 R |
| 8,455,763 | B2 | | 6/2013 | Dais et al. |
| 2007/0284108 | A1 | * | 12/2007 | Roes ....................... E21B 36/04 |
| | | | | 166/302 |

FOREIGN PATENT DOCUMENTS

| | | |
|---|---|---|
| DE | 102007022641 A1 | 11/2008 |
| DE | 102011003592 A1 | 8/2012 |
| EP | 2431982 A1 | 3/2012 |
| EP | 3065147 A1 | 9/2016 |

* cited by examiner

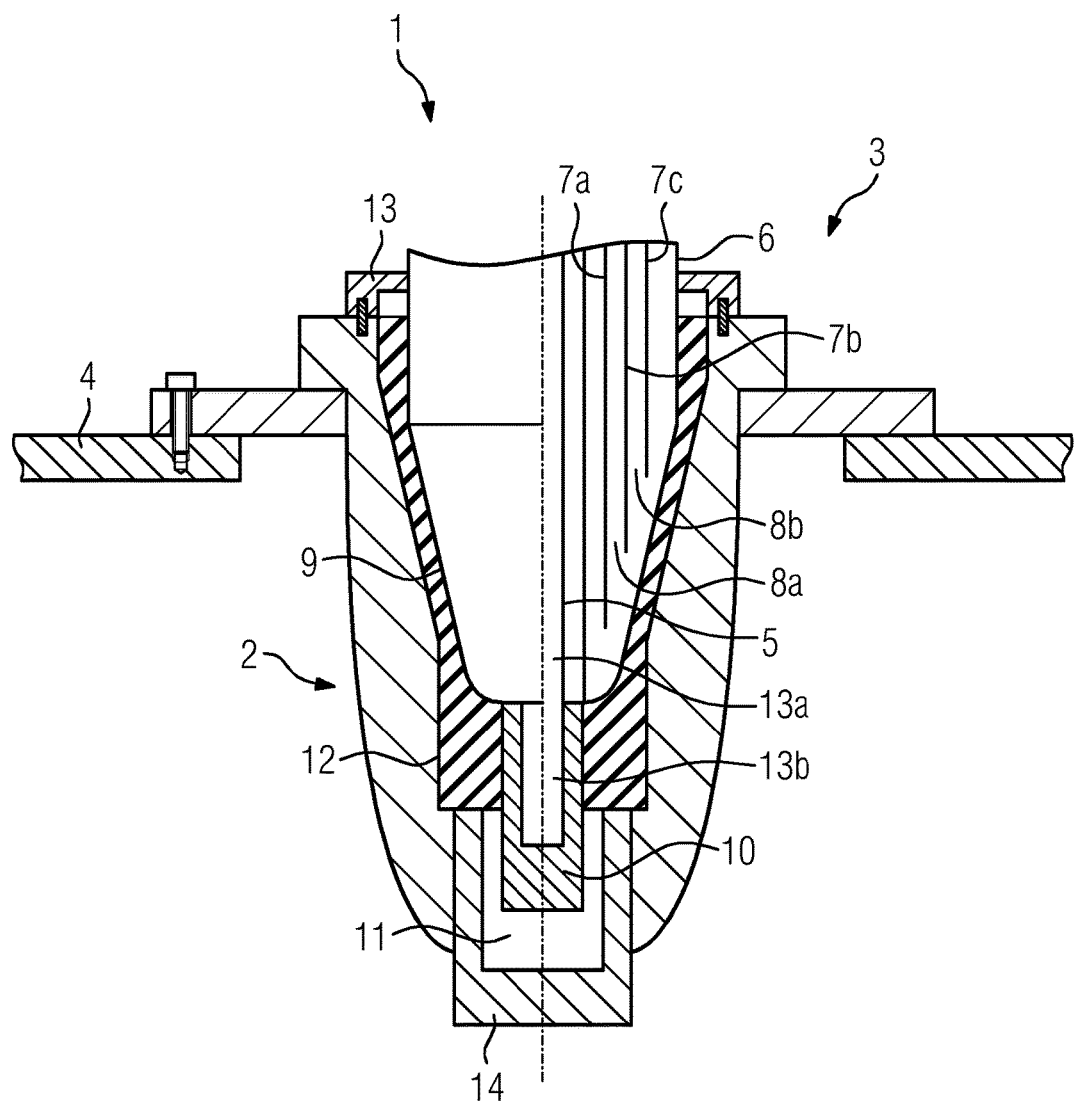

PLUGGABLE HIGH-VOLTAGE BUSHING AND HIGH-VOLTAGE INSTALLATION HAVING THE PLUGGABLE HIGH-VOLTAGE BUSHING

CROSS-REFERENCE TO RELATED APPLICATION

This application claims the priority, under 35 U.S.C. § 119, of German Patent Application EP 17183517.6, filed Jul. 27, 2017; the prior application is herewith incorporated by reference in its entirety.

BACKGROUND OF THE INVENTION

Field of the Invention

The invention relates to a pluggable high-voltage bushing having an internal conductor which extends in a conducting direction between a high-voltage connection and a plug-in section of the high-voltage bushing, the plug-in section is configured for plugging the high-voltage bushing into a bushing socket of an electrical device, and an insulating body at least partly encloses the internal conductor.

In general, such a high-voltage bushing has the task of insulating a high-voltage line situated at high-voltage potential having a current-carrying electric conductor from an environment situated substantially at ground potential, for example a wall of the electrical device of the high-voltage installation. The internal conductor of the high-voltage bushing in that case forms a part of the electric conductor or is inserted therein.

A high-voltage bushing of the type mentioned above is known from German Patent Application DE 10 2007 022 641 A1. That document discloses a transformer, which has a bushing socket into which a high-voltage bushing can be plugged in order to connect the transformer to a high-voltage network. Due to the use of a pluggable high-voltage bushing of that kind, it is possible to construct and operate the transformer having the high-voltage bushing with as little assembly outlay as possible.

When the high-voltage bushing is plugged into the bushing socket, the plug-in section is held by a recess formed by the bushing socket.

The plug-in section of the high-voltage bushing and the bushing socket are constructed in such a way that a reliable electrical contact can be produced between the internal conductor of the high-voltage bushing and the bushing socket, wherein the bushing socket is electrically connected to further elements of the electrical device. At the same time, the connection to the contact surfaces between the bushing socket and the plug-in section is sufficiently reinforced in dielectric terms so that operation at high-voltage level is made possible.

However, the previously known high-voltage bushing has the disadvantage that it is constructed only for voltages in the lower high-voltage range.

It is also known that, in the case of high currents through the internal conductor, heating phenomena can occur at the internal conductor and insulating body due to heat losses, which heating phenomena can lead to a reduction in the lifetime of the high-voltage apparatus. German Patent Application DE 10 2011 003 592 A1 discloses providing a vaporizable cooling liquid in the interior of the internal conductor, which is constructed as a waveguide, in order to reduce temperature gradients in the internal conductor and for improved transport of heat. The reduction in the temperature gradient within the high-voltage bushing increases the reliability of the high-voltage bushing during operation. The high-voltage bushing known from German Patent Application DE 10 2011 003 592 A1 is not constructed to be pluggable and accordingly does not have a pluggable plug-in section for a bushing socket.

SUMMARY OF THE INVENTION

It is accordingly an object of the invention to provide a pluggable high-voltage bushing and a high-voltage installation having the pluggable high-voltage bushing, which overcome the hereinafore-mentioned disadvantages of the heretofore-known devices of this general type and which can be used reliably in the higher high-voltage range.

With the foregoing and other objects in view there is provided, in accordance with the invention, a pluggable high-voltage bushing having an internal conductor which extends in a longitudinal direction between a high-voltage connection and a plug-in section of the high-voltage bushing, the plug-in section is configured for plugging the high-voltage bushing into a bushing socket of an electrical device, an insulating body at least partly encloses the internal conductor, the internal conductor has a heat pipe which is at least partly filled with a vaporizable cooling liquid, and the heat pipe extends into the plug-in section.

The cooling liquid can vaporize at hot points in the conductor cavity and then condense at cool points. In this way, the transport of heat in the internal conductor into the plug-in section is made possible according to the principle of a heat pipe. Heat is drawn from the hot points of the internal conductor and that heat is emitted again to colder points. In this way, the reliability of the high-voltage bushing can advantageously be increased.

The invention is based, in particular, on the knowledge that thermal loading can also arise in a pluggable high-voltage bushing due to high operating currents in the region of the bushing socket and the plug-in section of the high-voltage bushing.

In order to further increase the reliability and to reinforce the pluggable high-voltage bushing for higher voltage levels, it is accordingly proposed for a heat pipe, which is formed in the internal conductor, to extend in this case further into the plug-in section. The heat pipe expediently includes a cavity in which the cooling liquid is located. The cavity can be at least partly limited, for example, by the internal conductor, whereby the internal conductor at least partly forms the heat pipe. There may also be provision, for example, for two or more partial cavities, which together define the cavity of the heat pipe. One partial cavity is then formed, for example, in the internal conductor and the other partial cavity is formed in the plug-in section, wherein the partial cavities are connected to one another so that an exchange of the cooling liquid between them is possible. In this way, the temperature gradient can also be minimized in the region of the plug-in section. This advantageously increases the reliability of the entire pluggable high-voltage bushing. In addition, in one corresponding construction of its other elements, the high-voltage bushing can be used at voltages above 500 kV.

The plug-in section is fittingly located on a first axial end of the high-voltage bushing, which first axial end is opposite a second axial end on which an outdoor connection of the high-voltage bushing is disposed.

According to one embodiment of the invention, the high-voltage bushing includes a contact system for electrical contacting of the high-voltage bushing to a connection part of the bushing socket, wherein the heat pipe extends into the region of the contact system. The contact system can be formed, for example, of contact lamellae, projections or similar elements that can provide a reliable electrical and/or mechanical contacting between the high-voltage bushing or the internal conductor or further components connected to the internal conductor and the connection part and hence the electrical device. During operation of the high-voltage bushing, the contact system represents a critical component part with respect to the development of heat. If a conductor cavity that extends into the region of the contact system is provided, this critical component part of the high-voltage bushing can be cooled, which further increases the reliability of the high-voltage bushing. The conductor cavity expediently extends axially at least up to a mounting point of the contact system.

The insulating body preferably includes conductive control inserts disposed concentrically around the internal conductor, wherein the control inserts are isolated from one another by insulating layers. Such a bushing is generally referred to as a capacitively controlled bushing. The capacitive control inserts make uniform field control possible and thus increase the reliability of the high-voltage bushing, in particular at high voltages. The insulating layers can include paper and/or a nonwoven, for example.

The insulating body preferably includes a cured resin. For example, the high-voltage bushing can be soaked in a curable resin during the production process, for example after winding of the insulating layers. An insulating body with improved insulation can thus be obtained after the curing of the resin. The insulating body in this case is in the form of a compact block so that a main insulation using a gas can be omitted.

In order to make the field control possible in the connecting region between the high-voltage bushing and the bushing socket as well, it is considered advantageous for at least some of the control inserts to extend into the plug-in section of the high-voltage bushing. In this way, the electrical field can also be controlled effectively in the plug-in section so that the sensitive region of the connection between the bushing socket and the high-voltage bushing has improved electrical properties.

The plug-in section preferably has an external coating composed of a silicone material. The external coating can extend, for example, onto a part of the external surface of the plug-in section, preferably onto that part that is in contact with the bushing socket when the high-voltage bushing is inserted into the bushing socket. The coating allows particularly good dielectric reinforcement of the joint that is produced upon plugging-in. Instead of the external coating composed of silicone, another suitable elastic, electrically insulating coating material can also be used.

The cooling liquid is preferably deionized water. Deionized water is a cost-effective cooling liquid that is particularly easy to procure.

The high-voltage bushing preferably also includes a fastening flange for fastening the high-voltage bushing to a housing of the electrical device.

According to one embodiment of the invention, the internal conductor is constructed as a waveguide, the waveguide is sealed in a gas-tight manner at a first end side, and a connecting conductor section of the plug-in section adjoins a second end side of the waveguide. The connecting conductor section is configured, in cooperation with a contact system of the high-voltage bushing, to produce an electrical contact between the high-voltage bushing and the bushing plug socket and the connecting conductor section has a partial cavity that is open toward the second end side of the waveguide, with the partial cavity partly forming a cavity of the heat pipe. The waveguide itself accordingly at least partly forms the heat pipe. The connecting conductor section is fittingly electrically and mechanically connected to the internal conductor. The connection between the connecting conductor section and the internal conductor can, for example, be a welded connection. The contact system can include, for example, contact lamellae for electrical contacting. The contact system can be disposed, for example, between the connecting conductor section and a conductive connection part of the bushing socket so that the electrical connection between the high-voltage bushing and the bushing socket runs over the contact system. The partial cavity of the connecting conductor section can be constructed, for example, as a bore or a recess that is open on one side.

With the objects of the invention in view, there is also provided a high-voltage installation having an electrical device and a pluggable high-voltage bushing according to the invention, wherein the electrical device includes a bushing socket for holding or receiving the high-voltage bushing.

A high-voltage installation of this kind, in which the electrical device is a high-voltage transformer, is known from German Patent Application DE 10 2007 022 641 A1 that has already been mentioned above.

The object of the invention is to specify a high-voltage installation of the generic type that is as reliable as possible.

The object is achieved by virtue of the fact that a high-voltage bushing according to the invention is used for the high-voltage installation.

The advantages of the high-voltage installation according to the invention result, in particular, from the advantages of the high-voltage bushing according to the invention that have been described above.

According to one embodiment of the invention, the electrical device has a housing, which is at least partly filled with a liquid or gaseous insulating substance, wherein the housing is sealed in an insulating-substance-tight manner by using the bushing socket.

Other features which are considered as characteristic for the invention are set forth in the appended claims.

Although the invention is illustrated and described herein as embodied in a pluggable high-voltage bushing and a high-voltage installation having the pluggable high-voltage bushing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SINGLE VIEW OF THE DRAWING

The FIGURE is a fragmentary, diagrammatic, sectional view of an exemplary embodiment of a high-voltage installation according to the invention having a high-voltage bushing according to the invention.

DETAILED DESCRIPTION OF THE INVENTION

Referring now in detail to the single FIGURE of the drawing, there is seen a partial section of a pluggable high-voltage bushing 1. In the illustration of the FIGURE, the high-voltage bushing is plugged into a bushing socket 2 of an electrical device of a high-voltage installation in the form of a transformer 3. The bushing socket 2 is fastened to a housing wall 4. The housing wall 4 limits a transformer housing of the transformer 3, which is filled with a liquid or gaseous insulating substance or material, for example insulating oil. The fastening is embodied so as to be sealed in an insulating-substance-tight manner, with the result that the insulating substance cannot escape from the housing. The bushing socket 2 includes a conductive connection part 14 for producing an electrical connection between the high-voltage bushing 1 and the electrical device 3.

The high-voltage bushing 1 includes an internal conductor 5, which is constructed as a waveguide composed of aluminum or copper. The internal conductor 5 is surrounded by an insulating body 6. The insulating body 6 includes conductive control inserts 7a-c for capacitive field control. The control inserts are disposed concentrically around the internal conductor 5. The control inserts 7a-c are isolated from one another by insulting films 8a-b composed of paper, which are soaked in resin after winding onto the internal conductor 5.

The high-voltage bushing 1 also includes a plug-in section 9 for plugging the high-voltage bushing 1 into the bushing socket 2. The plug-in section 9 includes a conically tapering part of the insulating body and a connecting conductor section, which is welded in the form of a conductor bolt 10 to the internal conductor 5. A contact system 11 adjoins the conductor bolt 10. The contact system produces the electrical connection between the high-voltage bushing 1 and the transformer 3.

An intermediate space between the plug-in section 9 of the high-voltage bushing 1 and the bushing socket 2 is filled with a silicone material 12, in the form of an external coating composed of an elastic insulating coating material, which dielectrically reinforces the intermediate space.

The high-voltage bushing 1 is connected to the housing wall 4 of the transformer 3 by a fastening flange 13. The plug-in section 9 thus extends axially from the fastening flange 13 for fastening the high-voltage bushing 1 to the bushing socket 2 up to the contact system 11.

The internal conductor 5 is constructed as a waveguide and forms a heat pipe for minimizing the temperature gradient in the high-voltage bushing 1. The internal conductor 5 limits a cavity, which is a first partial cavity 13a of the heat pipe. The first partial cavity is partly filled with a cooling liquid. The conductor bolt 10 has a bore, which is a second partial cavity 13b of the heat pipe. The partial cavities 13a, 13b are connected to one another so that circulation of the cooling liquid in the entire conductor cavity is possible without a problem. The cooling-substance-tight connection between the conductor bolt 10 and the internal conductor 5 at one side of the high-voltage bushing 1 and between the internal conductor 5 and a non-illustrated sealing part on the other end side of the high-voltage bushing 1, which end side is remote from the bushing socket, prevents the vaporizing cooling liquid from leaking out of the cavity 13a, 13b of the heat pipe. As a result of the fact that the heat pipe extends into the plug-in section 9 of the high-voltage bushing 1, and in particular into the conductor bolt 10, advantageous cooling of the plug-in section 9 is ensured. It can be seen that the partial cavity 13b runs into the contact system 11. In this way, heat can also be dissipated from the contact system 11 by vaporization of the cooling liquid.

The high-voltage bushing 1 illustrated in the FIGURE is suitable, for example, for operation at voltages above 550 kV.

The invention claimed is:

1. A pluggable high-voltage bushing, comprising:
  a plug-in section for plugging the high-voltage bushing into a bushing socket of an electrical device, said plug-in section having an external coating composed of an elastic insulating coating material;
  an internal conductor extending in a longitudinal direction between a high-voltage connection and said plug-in section, said internal conductor having a heat pipe being at least partly filled with a vaporizable cooling liquid, said heat pipe extending into said plug-in section; and
  an insulating body at least partly enclosing said internal conductor.

2. The high-voltage bushing according to claim 1, which further comprises a contact system for electrical contacting of the high-voltage bushing to a connection part of the bushing socket, said heat pipe extending into a region of said contact system.

3. The high-voltage bushing according to claim 1, wherein said insulating body includes conductive control inserts disposed concentrically around said internal conductor, and insulating layers isolate said control inserts from one another.

4. The high-voltage bushing according to claim 3, wherein said insulating body includes a cured resin.

5. The high-voltage bushing according to claim 3, wherein at least some of said control inserts extend into said plug-in section.

6. The high-voltage bushing according to claim 1, wherein said vaporizable cooling liquid is deionized water.

7. The high-voltage bushing according to claim 1, which further comprises a fastening flange for fastening the high-voltage bushing to a housing of the electrical device.

8. A high-voltage installation, comprising:
  a high-voltage bushing according to claim 1; and
  an electrical device including a bushing socket for receiving said high-voltage bushing.

9. The high-voltage installation according to claim 8, wherein said electrical device has a housing being at least partly filled with a liquid or gaseous insulating substance, said housing being sealed in an insulating-substance-tight manner by said bushing socket.

10. A pluggable high-voltage bushing, comprising:
  a plug-in section for plugging the high-voltage bushing into a bushing socket of an electrical device;
  a contact system;
  an internal conductor extending in a longitudinal direction between a high-voltage connection and said plug-in section, said internal conductor having a heat pipe being at least partly filled with a vaporizable cooling liquid, said heat pipe extending into said plug-in section, said internal conductor being a waveguide having first and second end sides, said waveguide being gas-tightly sealed at said first end side;
  an insulating body at least partly enclosing said internal conductor; and
  a connecting conductor section adjoining said second end side, said connecting conductor section being configured, in cooperation with said contact system, to produce an electrical contact between the high-voltage bushing and the bushing plug socket;

said connecting conductor section having a partial cavity being open toward said second end side, said partial cavity partly forming a cavity of said heat pipe.

\* \* \* \* \*